(12) United States Patent
Bobisuthi et al.

(10) Patent No.: US 7,457,644 B1
(45) Date of Patent: Nov. 25, 2008

(54) MICROPHONE POSITION AND SPEECH LEVEL SENSOR

(75) Inventors: James F. Bobisuthi, Boulder Creek, CA (US); Robert J. Bernardi, Scotts Valley, CA (US); Steven F. Burson, Scotts Valley, CA (US); Lawrence W. Gollbach, Ben Lomond, CA (US); Allen Woo, Scotts Valley, CA (US)

(73) Assignee: Plantronics, Inc, Santa Cruz, CA (US)

( * ) Notice: Subject to any disclaimer, the term of this patent is extended or adjusted under 35 U.S.C. 154(b) by 0 days.

(21) Appl. No.: 11/594,344

(22) Filed: Nov. 7, 2006

Related U.S. Application Data

(60) Continuation of application No. 10/940,130, filed on Sep. 13, 2004, now Pat. No. 7,133,701, which is a division of application No. 09/952,434, filed on Sep. 13, 2001, now Pat. No. 6,941,161.

(51) Int. Cl.
*H04M 1/00* (2006.01)

(52) U.S. Cl. ............ 455/570; 455/569.1; 381/71.1
(58) Field of Classification Search ............ 455/570, 455/3.06, 212, 214, 221, 67.13, 569.1, 556.1; 381/72, 74, 58, 56, 71.1, 73.1; 379/142.13, 379/167.13, 406.08, 428.02
See application file for complete search history.

(56) References Cited

U.S. PATENT DOCUMENTS 7,003,123 B2 * 2/2006 Kanevsky et al. ............ 381/72

\* cited by examiner

*Primary Examiner*—CongVan Tran

(57) ABSTRACT

Improper microphone position and speech level on a telephone headset is sensed by comparison of a speech envelope to multiple signal threshold levels. A first threshold is used to determine whether a headset user is talking. A second threshold is used to determine whether a signal level at the microphone is sufficiently strong for proper communication. An indicator is activated when the user is talking and the signal level is too weak. Typically, a weak signal is caused by a mispositioned microphone or a user talking too softly.

17 Claims, 10 Drawing Sheets

Simplified Block Diagram

MICROPHONE POSITION AND SPEECH LEVEL SENSOR

CROSS REFERENCE TO RELATED APPLICATIONS

This application is a continuation of U.S. patent application Ser. No. 10/940,130, filed Sep. 13, 2004, now U.S. Pat. No. 7,133,701, which is a divisional of application Ser. No. 09/952,434, filed Sep. 13, 2001, now U.S. Pat. No. 6,941,161, the entireties of which are incorporated by reference herein.

BACKGROUND OF THE INVENTION

A. Technical Field

The present invention relates generally to the proper operation of telephone headsets and other communication devices. Specifically, the present invention relates to the identification of a voice signal from a microphone in a headset or communication device that is too weak and the subsequent notification of the weak signal to a user.

B. Background of the Invention

Communications headsets typically have a microphone positioned on an adjustable arm that allows a user to move the microphone to a desired position, which the user finds comfortable. However, the adjustable arm may also be mispositioned without the user's knowledge. This problem occurs most notably with users who have little experience and/or training in the proper use of communications headsets.

Effective use of a communications headset requires that the microphone be positioned within a particular distance from the user's mouth. The importance of properly positioning a microphone is amplified when high quality noise canceling microphone headsets are used. A mispositioned noise canceling microphone experiences a reduction of sensitivity to the user's voice, but its sensitivity to background noise remains the same. In either case, the microphone's signal to noise ratio (the ratio of the user's voice to ambient noise) decreases, thereby reducing the overall quality of the voice signal or rendering the voice signal unintelligible at the receiver side.

The use of a headset allows a user to perform other tasks while having a conversation. For example, telemarketers often use headsets because it allows the use of a computer during a conversation. Oftentimes, because of various distractions like the use of a computer during a conversation, a user does not talk loud enough to ensure a sufficient sound quality at the receiver side. As was the case with a mispositioned microphone, the user is unaware of the poor sound quality at the receiver side until the listener verbally indicates the problem.

Attempts to remedy poor sound quality have focused on reducing the signal to noise ratio at the receiver side. For example, U.S. Pat. No. 5,091,954, entitled "Noise Reducing Receiver Device," (hereinafter Sasaki) uses a feedback mechanism on an amplifier in a telephone receiver to adjust the transfer function of the amplifier. The transfer function is shifted to remove ambient noise in the signal. However, Sasaki is designed for situations where the signal to noise ratio is above a specific level. If for example, the microphone is grossly mispositioned or the user is talking extremely quietly, then the signal may be too weak for the amplifier to function properly. As a result, a talker-side solution is required for a mispositioned microphone identification device.

U.S. Pat. No. 4,777,649, entitled "Acoustic Feedback Control of Microphone Positioning and Speaking Volume," (hereinafter Carlson) describes an apparatus coupled to a telephone handset that will detect when a handset is either too close or too far from a user's mouth. Specifically, a circuit determines whether the handset is mispositioned using multiple comparators. A first comparator is used to determine whether the handset is too far by comparing a voice signal from a handset microphone to a first threshold. If the signal is weaker than the first threshold than the microphone is too far. A second comparator is used to determine whether the handset is too close by comparing a voice signal from the handset microphone to a second threshold. If the signal is strong than the second threshold than the microphone is too close. A switch is used to turn off the voice feedback into the handset speaker when the microphone is mispositioned, that is, when the signal is either below the first threshold or above the second. As a result, if the microphone is properly positioned then the user will hear his/her own voice in the handset speaker. However, if the microphone is mispositioned, the user will not hear his/her voice in the handset speaker.

Carlson's use of the user's own voice as the indication of whether the microphone is mispositioned results in inherently limited quality and reliability. For example, if Carlson's circuit were to malfunction, the handset itself would be almost inoperable because the user could not hear his/her voice in the handset speaker. Second, the notification directly interrupts the use of the handset which reduces the quality of the conversation because the handset's feedback into the earpiece may be activated multiple times during a conversation causing an uncontrollable distraction to the handset user. As mentioned above, these limitations are caused by the fact that Carlson does not detect speech levels below an audible threshold. As a result, there is a need for a mispositioned microphone identification device that senses when a user is actually speaking below an audible threshold so that a microphone misposition indication may be provided by a device not implementing the talker's actual voice (i.e., voice feedback).

Accordingly it is desirable to provide a microphone position and speech level sensor that operates on the talker-side and senses when a user is actually talking.

As described above, at least a portion of Carlson's circuit is embedded in the handset itself. Specifically, the voice feedback mechanism is operating within the earpiece and is inseparably coupled to the earpiece circuitry. As a result, a handset may not be upgraded to include Carlson's mispositioning circuitry; rather the entire handset must be replaced. This upgrade would be very expensive for companies who use a large number of handsets. For example, telemarketing companies require a large number of handsets or headsets and replacing all of these would be costly.

Accordingly, it is desirable to provide a microphone position and speech level sensor that may be used to upgrade pre-existing headsets or handsets.

SUMMARY OF THE INVENTION

The present invention overcomes the deficiencies and limitations of the prior art by providing a system and method for identifying a mispositioned microphone and/or a corresponding improper speech level at a telephone headset microphone. In particular, the present invention provides a talker-side implementation that compares a voice signal from a headset microphone to two thresholds in order to detect whether a headset user is talking and the signal level at the microphone is sufficiently strong. These comparisons are typically done in parallel but may also be done in sequence. A weak signal is generally indicative of the microphone being incorrectly positioned or the user talking too softly. It is important to note that the present invention may be implemented in a variety of other communication devices that require a user's mouth to be properly positioned to a microphone. For example, the invention may be used in a telephone handset, cellular phone, or microphone in a PA system.

In one embodiment, the first threshold is used to determine when a user is actually talking. This first threshold represents an ambient noise level typical of an environment in which the headset is being used. A first comparator receives a voice signal from the microphone and compares it to the first threshold. If the voice signal is stronger than the first threshold, then a user is actually talking into the microphone. If the voice signal is weaker than or equal to the first threshold, then a user is not talking.

The second threshold is used to determine whether the voice signal is too weak. This second threshold represents levels that are ordinarily attained only by speech at adequate levels. A second comparator receives a voice signal from the microphone and compares it to the second threshold. If speech peaks within the voice signal are consistently stronger than the second threshold, then the microphone is properly positioned. If the voice signal is weaker than or equal to the second threshold, then the signal-to-noise ratio of the voice signal at the microphone is too low to provide sufficient quality at a user side of the telephone call. Either a microphone being mispositioned or a user talking too quietly typically causes this weak voice signal.

An indicator is coupled to the comparators and used to signal a user when a voice signal is too weak. Logic (e.g., hardware or software) controlling the indicator receives data from each comparator representing (1) whether a user is talking and (2) whether a corresponding voice signal is too weak. If a user is talking but the voice signal is too weak (i.e., the voice signal is above the first threshold and below the second threshold), the logic activates the indicator to signal the user to either adjust the microphone or talk louder. This indicator may be a visual indicator or an auditory indicator.

The features and advantages described in this summary and the following detailed description are not all-inclusive, and particularly, many additional features and advantages will be apparent to one of ordinary skill in the art in view of the drawings, specification, and claims hereof.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

In the following description, for purposes of explanation, numerous specific details are set forth in order to provide a thorough understanding of the invention. It will be apparent, however, to one skilled in the art that the invention can be practiced without these specific details. In other instances, structure and devices are shown in block diagram form in order to avoid obscuring the invention. References to numbers without their subscripts (e.g., 205) are understood to reference all instances of the subscripted numbers. Moreover, it should be noted that the language used in this disclosure has been principally selected for readability and instructional purposes, and may not have been selected to delineate or circumscribe the inventive subject matter, resort to the claims being necessary to determine such inventive subject matter.

A. Overview of Microphone Position and Speech Level Sensor

Figure 1:
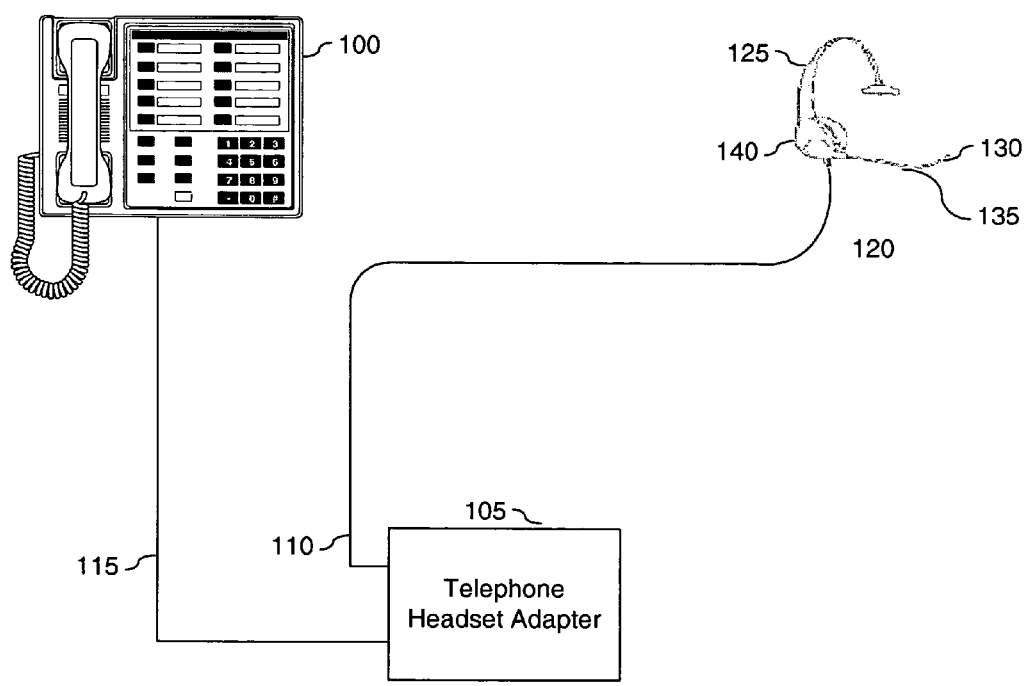
FIG. 1 illustrates a system including an adjustable headset, telephone and telephone headset adapter in accordance with one embodiment of the present invention.

The present invention is directed towards a talker-side device that measures the strength of a voice signal from a microphone. The microphone may be positioned on an adjustable or fixed arm on a communications headset or in a telephone handset. Additionally, the present invention may operate on a PA system comprising a microphone or any other device requiring a microphone to be properly positioned in relation to a talker's mouth. Although an embodiment is described as operating in a telephone headset system, the present invention's systems and methods should not be limited to this embodiment. Rather, the present invention may operate in relation to any communication device requiring a speech level above a particular threshold at a microphone. As best shown in FIG. 1, one embodiment of the present invention is used within a telephone headset system.

A telephone headset system generally comprises a headset 120, a telephone adapter 105, and a telephone 100 as well as connections between the devices. The headset 120 includes a speaker 140 that is placed near the ear of a headset user. As shown in FIG. 1, a headband 125 is used to hold the speaker against a user's ear, though in other embodiments, earbud or earhook headsets may also be used. A microphone 130 is attached to the end of an arm 135 and the arm is coupled to the headband 125. This arm 135 may be adjustably mounted on the headband 125 so that the position of the microphone 130 can be moved. This feature allows the headset to fit many different people because the adjustable microphone may be correctly positioned relative to a user's mouth.

The headset 120 may be electrically coupled to a headset adapter 105 via line 110. The headset adapter 105 receives a signal from the microphone 130 on the headset 120 and transmits a signal to the speaker 140 on the headset 120. It is important to note that these signals may be transmitted wirelessly by transceivers on both the headset 120 and headset adapter 105, and hence line 110 should be understood to include either a wire connection or a wireless connection, e.g., radio, infrared. In any event, a signal from the microphone representative of a user's voice is transmitted from the headset 120 to the headset adapter 105. The headset adapter 105 is also electrically coupled to a telephone 100. Therefore, the headset adapter 105 functions as an interface between the telephone 100 and the telephone headset 120. Additionally, the headset adapter 105 may have other functions such as operating as a switch between the telephone headset 120 and a handset on the telephone 100.

Figure 2A:
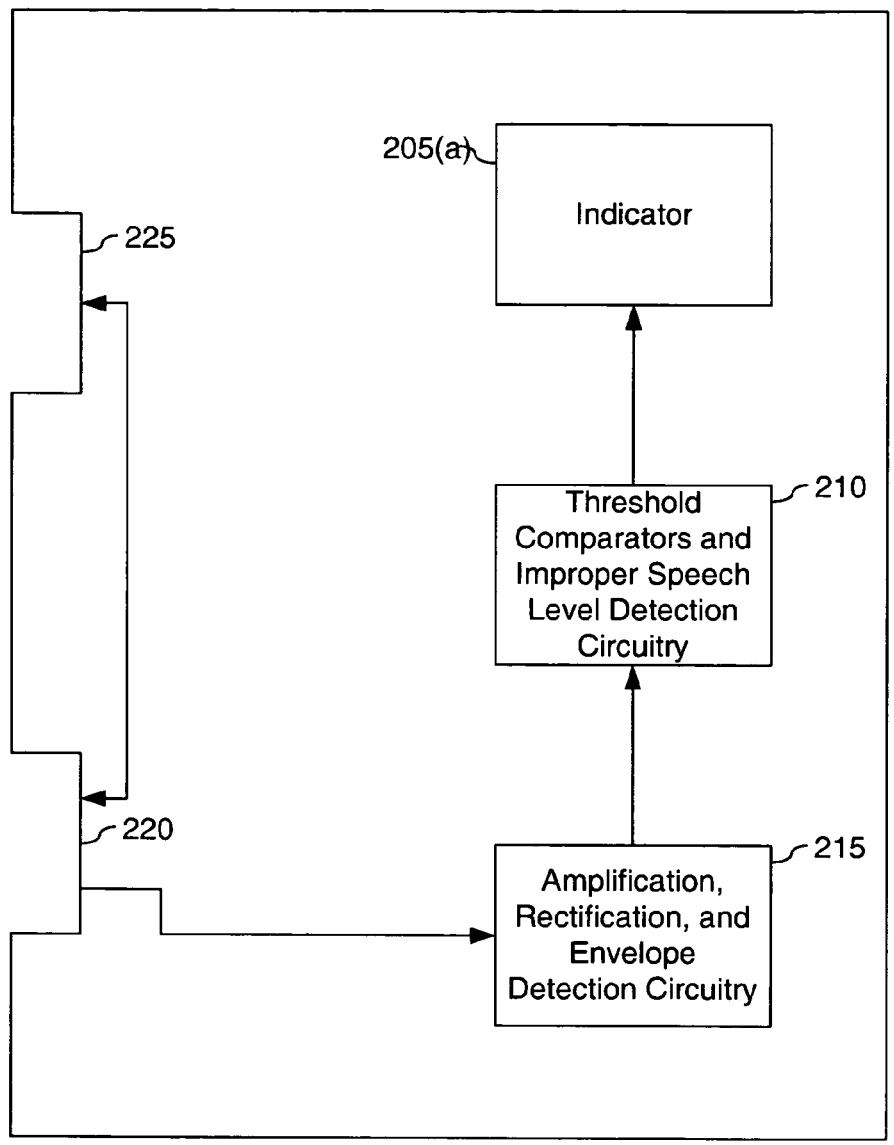
FIG. 2A illustrates a telephone headset adapter containing an improper speech level indicator.

FIG. 2A shows a first embodiment of the present invention functioning within a telephone adapter 105. As shown, a telephone adapter 105 contains at least two interfaces. A first interface 220 connects a telephone headset 120 to amplification, rectification and envelope detection circuitry 215 within the telephone adapter 105. An example of a first interface 220 is a telephone jack that allows a telephone headset line to plug into the telephone adapter 105 and communicate with the amplification, rectification and envelope detection circuitry 215. The first interface 220 may include other types of connection interfaces that allow data to be transmitted between the telephone headset 120 and the telephone adapter 105 such as a wireless transceiver. The first interface 220 is also coupled to a second interface 225 that connects the telephone adapter 105 to the telephone 100. This second interface 225 is generally a telephone jack or other hard-wire connection.

The amplification, rectification and envelope detection circuitry 215 comprises a buffer amplifier, a full-wave rectifier and a precision envelope detector and is coupled to threshold comparators and improper speech level detection circuitry 210. This amplification, rectification and envelope detection circuitry 215 receives a voice signal from the telephone headset 120 via the first interface and outputs a speech envelope signal representative of the voice signal. This speech envelope signal may then be analyzed to determine whether a telephone headset user is talking and whether the voice signal level is sufficiently high.

The threshold comparators and improper speech level circuitry 210 compares the speech envelope signal to two thresholds. These comparisons are typically done in parallel but may also be done sequentially. This signal is compared to an average noise threshold in order to determine whether a voice signal from the microphone is present. The signal is also compared to a desired audible level threshold in order to determine whether the speech envelope has achieved desired speech peak indicative of a voice signal level necessary for proper communication. These comparators output pulses indicating whether the speech envelope level and corresponding speech peaks is above or below their corresponding thresholds. The pulses are input in logic within the threshold comparators and improper speech level detection circuitry 210 and a signal is output indicating whether a user is talking and a voice signal is too weak. This output signal is transmitted to an indicator 205(*a*).

The indicator notifies a telephone headset user that the voice signal at the microphone is not sufficiently strong (i.e. a low signal-to-noise ratio). The indicator 205(*a*) may be part of the adapter 105, such as a visual indicator like a light emitting diode (LED), or an auditory indicator, such as a speaker that generates an audible tone. Alternatively, the indicator 205(*a*) maybe coupled to the receive lines of the headset speaker, so that the generated tone indicating improper speech level is output in the headset speaker, and heard directly by the user.

It is important to note that a low signal-to-noise ratio may be indicative of problems other than a mispositioned microphone. For example, a user may be talking too softly into the microphone. As a result, the indicator 205(*a*) also serves as a general warning indicator representative of the signal at the microphone. Therefore, after perceiving the activated indicator 205(*a*) (e.g., seeing a light or hearing a tone), the user can re-position the microphone and/or talk louder so as to increase a corresponding signal-to-noise ratio.

Figure 2B:
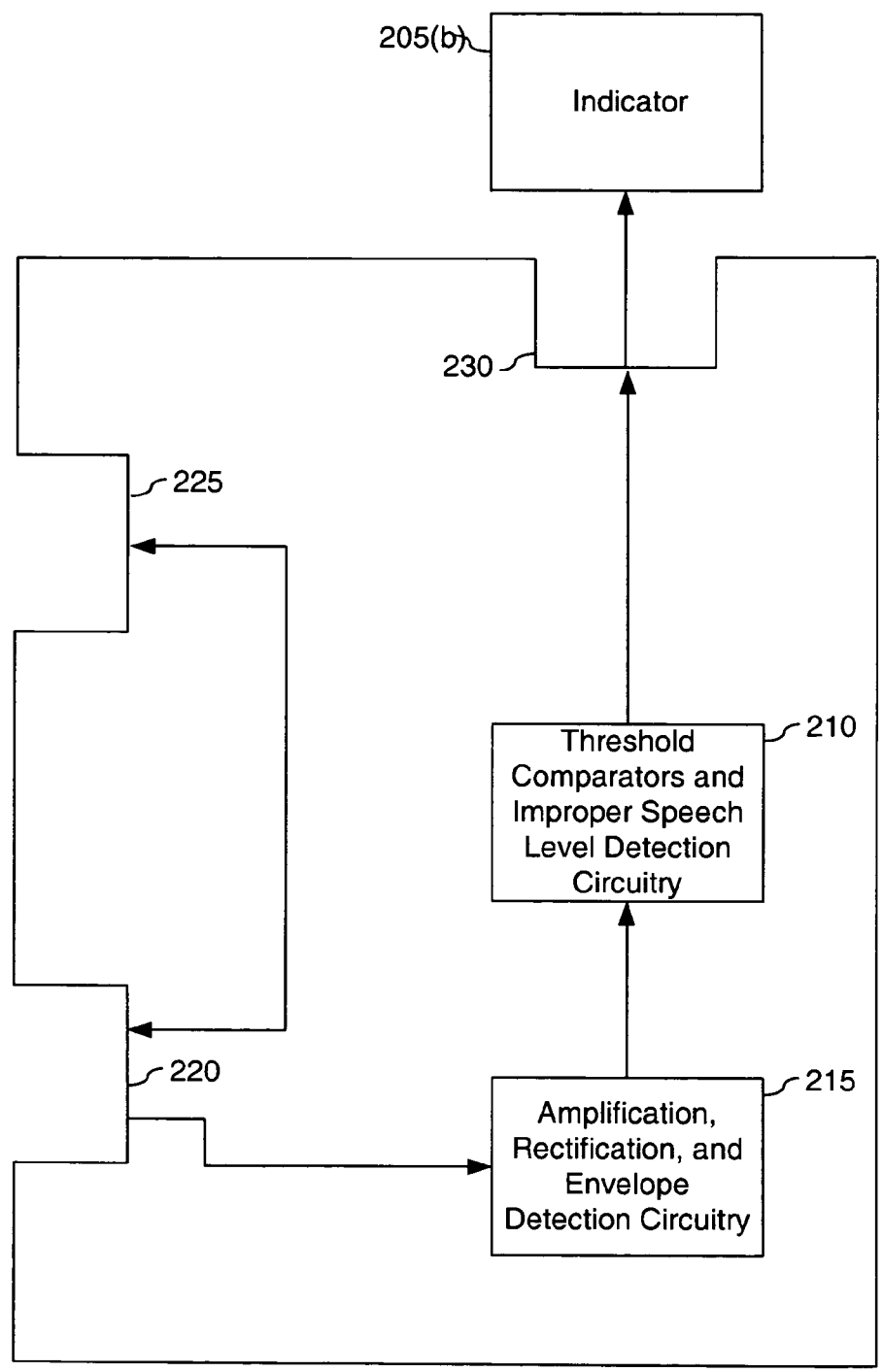
FIG. 2B illustrates a telephone headset adapter and a plug-in improper speech level indicator accessory.

FIG. 2B shows a second embodiment of the present invention whereby an indicator 205(*b*) is external to the telephone adapter 105. As shown, the telephone adapter 105 includes a third interface 230. The third interface 230 couples the external indicator 205(*b*) to the improper speech level detection circuitry 210 within the telephone adapter 105. Examples of the third interface 230 include a fixed line connection whereby the external indicator 205*b* is electrically coupled to the improper speech level detection circuitry 210, and a plug in jack (e.g., mini-8) whereby the indicator 205(*b*) may be attached or removed by connecting a plug into the third interface 230. Additionally, the third interface 230 may be a transceiver that transmits a wireless signal to the external indicator 205(*b*).

The threshold comparators and the improper speech level detection circuitry 210 activates the external indicator 205(*b*) via the third interface 230. Examples of the external indicator include a light (e.g., LED) positioned on a stand, a light positioned on the telephone headset, or a tone generator (e.g., speaker). The external positioning of the indicator 205*b* allows a user to select a particular indicator as well as allowing a vendor the option of selling the indicators as "plug-in" modules to the headset adapter. An example of a "plug-in" module is described in U.S. patent application Ser. No. 09/401,070, entitled "Accessory Interface Bus For Telephone Headset Adapter, filed Sep. 22, 1999, the disclosure of which is incorporated herein by reference.

B. General Description of Microphone Position and Speech Level Sensor

Figure 3:
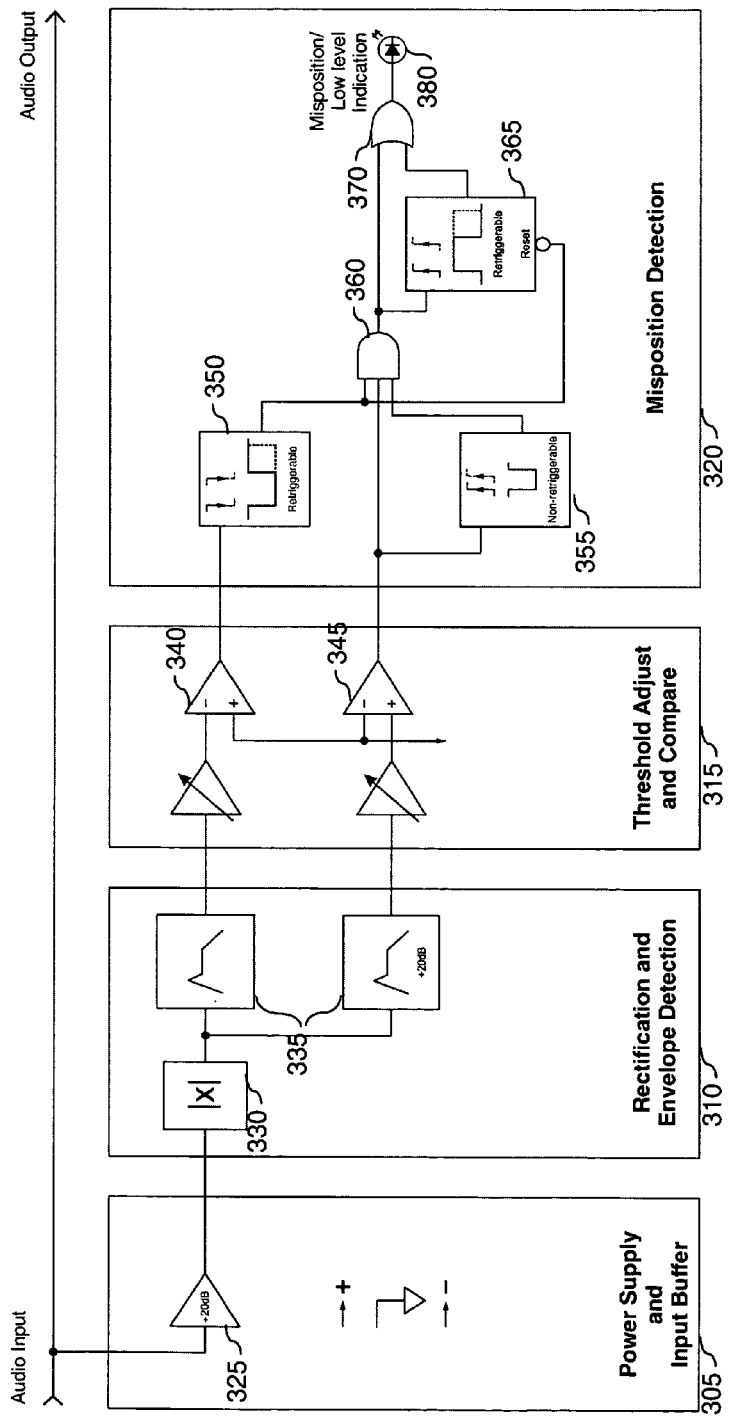
FIG. 3 illustrates a simplified block diagram of an improper speech level sensing circuit.

FIG. 3 shows a simplified block diagram of the improper speech level detection circuitry. This circuitry comprises four stages: a power supply and input buffer stage 305, a rectification and envelope detection stage 310, a threshold adjust and compare stage 315, and a misposition detection stage 320. An audio input is coupled to the power supply and input buffer stage 305 and receives a signal from the telephone headset 120. The power supply and input buffer stage 305 includes a buffer amplifier 325 with a predefined gain. In this embodiment, the gain is set at 20 dB. The amplifier 325 receives a signal from the audio input, applies a gain to the signal, and transmits the signal to the rectification and envelope detection stage 310.

The rectification and envelope detection stage 310 comprises a full-wave rectifier 330 and a precision envelope detector 335. The amplified signal received from the power supply and input buffer stage 305 is transmitted to the full-wave rectifier 330. The full-wave rectifier 330 converts the amplified signal to an average direct current signal representative of the instantaneous magnitude of the amplified signal. The rectified signal is then transmitted to the precision envelope detector 335. The precision envelope detector 335 converts the rectified instantaneous magnitude into a short-term average magnitude representing the speech envelope. This conversion by the precision envelope detector 335 allows independent control of the attack and decay characteristics of the rectified signal. The speech envelope signal is transmitted to the threshold adjust and compare stage 315.

The threshold adjust and compare stage 315 comprises two comparators. A first comparator 345 determines whether the speech envelope level is above a background noise threshold. A second comparator 340 determines whether voice peak levels in the speech envelope cross an audible threshold level required for proper communication. As mentioned above, these comparisons are typically done in parallel but may also be done sequentially.

The background noise threshold typically represents the ambient noise level of the environment in which the telephone headset or communications device operates. For example, a background noise threshold for a communications device operating on a warehouse floor is generally higher than a threshold for a communications device used in an office. This background noise threshold may be fixed or may be dynamically adjusted as the ambient noise changes. An embodiment may include a plurality of fixed background noise thresholds. A switch or keyboard allows a user to select a specific background noise threshold depending on the environment in which the communication device is being used. Another embodiment may provide an adaptive background noise threshold that dynamically adjusts to a particular environment. A method in which the background noise threshold may be dynamically adjusted comprises monitoring a signal received by the communications device. If this received signal is active (i.e., a person on the other side of the conversation is speaking) and the signal from the communication device is relatively low (i.e., indicative of a person listening), then the signal from the communication device likely represents the ambient noise of the environment in which the communication device is operating. The level of this signal may then be used to set a relatively accurate noise threshold level.

The speech envelope is received from the rectification and envelope detection stage 310 and compared to the background noise threshold by the first comparator 345. If the speech envelope level is above the noise threshold then the comparator outputs a logical TRUE (e.g., +5V). This output indicates that a user is speaking into the telephone headset or communication device. The background noise threshold is usually slightly above the ambient noise level in order to minimize erroneous TRUE outputs caused by sudden loud noises. Note that for a noise-canceling microphone this level is significantly lower than for an omni-directional microphone with the same sensitivity to the user's voice. It is particularly important that the background noise threshold be set as low as possible for noise-canceling microphones since positioning errors cause a more rapid loss of sensitivity to the user's voice and detection of the user's voice is necessary for the proper operation of the circuit.

The audible threshold typically represents a required voice signal level required for proper communication. For example, a microphone within a telephone headset requires that a user's voice be at a minimum decibel level in order for a person on the other side of a conversation to be able to easily hear what is being said. Although this threshold may vary depending on the specific communication device that is used, the threshold is generally fixed and infrequently adjusted. The speech envelope is received from the rectification and envelope detection stage 310 and speech peaks within the speech envelope are monitored by the second comparator 340 to determine whether they cross the audible threshold. If these speech peaks cross the audible threshold then the second comparator 340 outputs a logical FALSE (e.g., 0V). This output indicates that the voice signal is sufficiently strong at a microphone in a telephone headset or communication device. However, while the level of the speech envelope, including speech peaks therein, remains below the audible threshold, then the second comparator 340 outputs a logical TRUE.

Both outputs are transmitted to the misposition detection stage 320 comprising a first retriggerable monostable 350, a non-retriggerable monostable 355, a second retriggerable monostable 365, and various logic gates. The misposition detection stage 320 receives the outputs from the first comparator 345 and the second comparator 340 and determines whether a voice signal is not sufficiently strong at a microphone in a telephone headset or communication device.

A normal speech envelope takes time to develop to its peak amplitude. If a simple "AND" function is used to identify a weak voice signal, a temporary misposition or improper speech level indication will occur before the audible threshold is reached, be interrupted by the signal from the second comparator 340, then will resume as the envelope decays toward the noise threshold. In addition, the indicator 380 will flash only for the interval that the signal exceeds the noise threshold and be blanked only for the time it is actively above the audible threshold. For very low speech or severe mispositioning these flashes may be too brief to be obvious. While transient outputs of the AND gate for low level speech could be stretched, the transient outputs during the attack and decay of normal speech would also be stretched, giving steady false indications for all normal speech.

According to one embodiment, the non-retriggerable monostable 355 is provided to inhibit an improper speech level or microphone misposition indication for a period of time required by a speech envelope to develop and reach the audible threshold. For example, the non-retriggerable monostable 355 may suppress an indication for 100 ms allowing the speech envelope to reach the audible threshold. After this interval, if the signal is still between the two thresholds, an indication is activated showing that the audible threshold has not been exceeded for a certain period of time by various peaks within the speech envelope. This process will be described in greater detail below.

The dynamics of speech are such that extreme variation in momentary speech level exists even within speech that is perceived overall to be normal in level. The duration and interval between speech peaks varies inversely with their intensity, which means that the higher the audible threshold is set, the less frequently it will be exceeded. Typically, speech is found between these speech peaks and the speech between the peaks is of insufficient strength to prevent false misposition or improper speech level indications. This requires that the inhibiting effect of the peaks be set to at least extend over the duration of the decay of the envelope of a phoneme. In practice it was found that even significantly mispositioned microphones would exhibit enough peaks to limit the usefulness of the display if the threshold and time constant were set low enough to be treated on a phoneme basis. This was due to the large variations in the intensity of individual phonemes, which in turn requires a fairly low audible threshold to avoid regular false indications during normal speech. When a time constant was extended to cover several words worth of duration and the audible threshold raised so that only occasional phonemes would cross threshold, false microphone misposition or improper speech level detection became less common and reliable detection was improved.

The first retriggerable monostable 350 is implemented to set the amount of time before another speech peak is expected to cross the audible threshold. Since speech peaks are only expected to cross the audible threshold occasionally, and speech between thresholds is expected to be present over most of that interval, it is necessary to inhibit the improper speech level indication until the next peak is overdue. The amount of time is dependent on the level selected for the audible threshold since detection using lower thresholds can be expected to occur more frequently. For example, the first retriggerable monostable 350 may provide a 3 second time constant during which the output of an improper speech level indication is prevented, even if there is detected speech above the background noise threshold and below the audible threshold. Speech peaks within the speech envelope signal that cross the audible threshold will reset the improper speech level indicator 380, terminating any activated improper speech level indication and preventing any new indication for an established duration of time relative to the time constant. This process will be described in more detail below.

The second retriggerable monostable 365 provides a minimum duration for which the indicator 380 is activated. This second monostable 365 prevents the indicator 380 from flickering on and off, and also ensures that the indicator 380 is turned on a sufficient duration so that a user will notice the indication. For example, the second monostable 365 may require that an initiated indication stay on for a minimum time period of 1 second. If the voice signal remains weak during this interval the indication will persist without interruption.

An AND gate 360 has inputs coupled to the first retriggerable monostable 350, the second comparator 345, and the non-retriggerable monostable 355. The AND gate 360 will output a logical TRUE when a detected voice signal is too weak and the inverted pulse from the non-retriggerable monostable 355 has passed (i.e., the initial time delay is complete).

An OR gate 370 has inputs coupled to the AND gate 360 output and the second retriggerable monostable 365. The output of the OR gate 370 is coupled to the indicator 380 and turns it on if either input is high. As a result, as long as the retriggerable monostable is firing or the AND gate output is a logical TRUE, then the indicator 380 is activated. As previously described, the indicator 380 may be visual (e.g., an LED) or auditory (e.g., a beep).

Figure 4A:
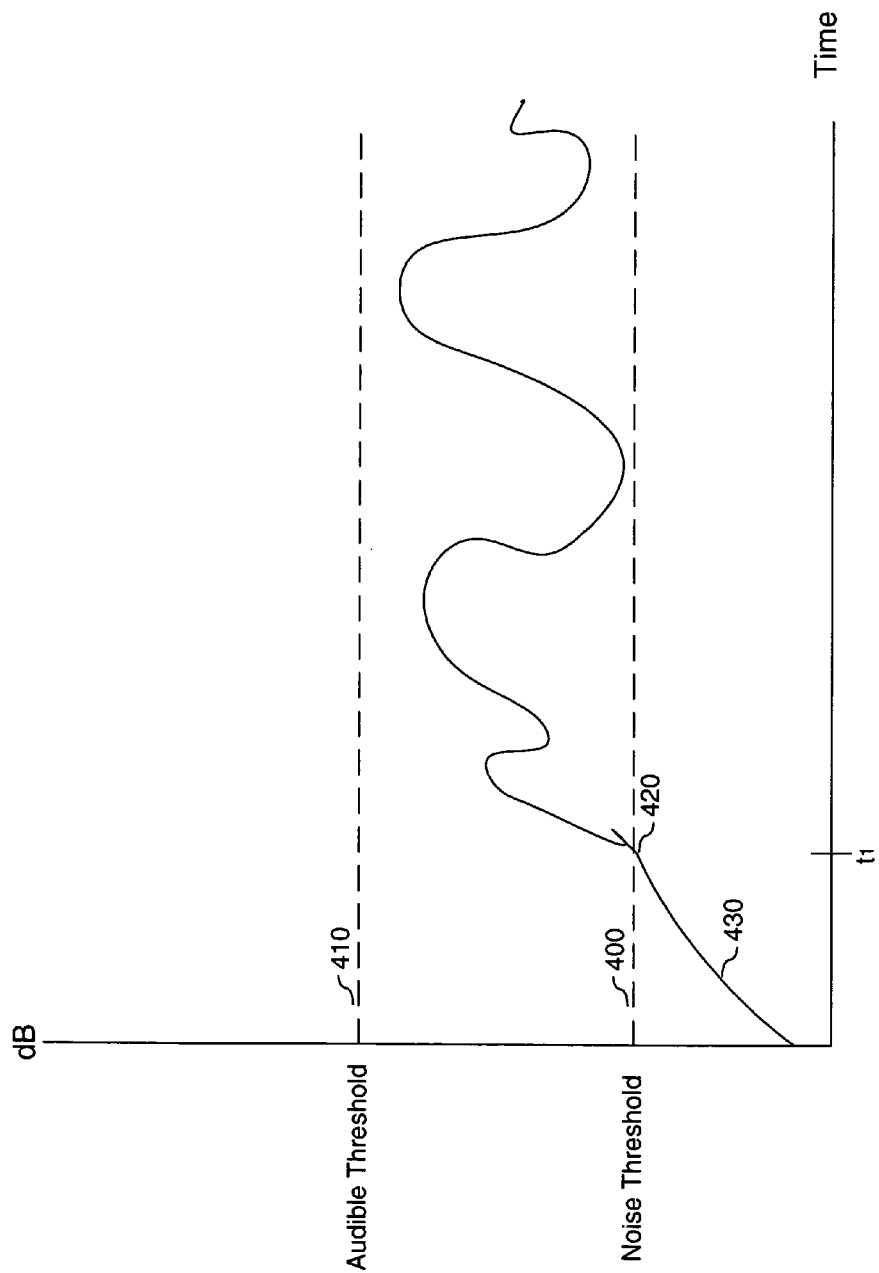
FIG. 4A illustrates a graphical representation of an improper speech level at a microphone resulting in a signal level between a noise threshold and an audible threshold.

FIG. 4A is a graphical representation of a weak voice signal at a microphone within a telephone headset or communication device that is detected by various embodiments of the present invention. A noise threshold 400 is shown at a particular decibel (dB) level. An audible threshold 410 is shown at another particular dB level. A speech envelope level 430 is shown tracing a generic speech pattern 430. At a specific point of time $t_1$ 420, the speech pattern 430 crosses the noise threshold 400. At this moment of time $t_1$, the output on the first comparator 345 will go high indicating that a user is talking. In response, the non-retriggerable monostable 355 will output an inverted pulse suppressing a microphone misposition or improper speech level indication for a period of time required for the speech envelope to develop. At the same moment of time $t_1$, the second comparator 340 will be high indicating that a speech peak has not crossed the audible threshold and will remain high until a speech peak crosses this threshold. The first retriggerable monostable 350 output will remain high (presuming that it had not been activated by a previous speech peak), enabling the indicator 380 to activate after the initial suppression time period has passed. In this instance, the speech peaks within the speech envelope do not cross the audible threshold 410, but remain between the noise threshold 400 and the audible threshold 410. As a result, according to this embodiment, the indicator 380 will be activated after the initial suppression time has passed since the output on the first comparator 345 remains high.

Figure 4B:
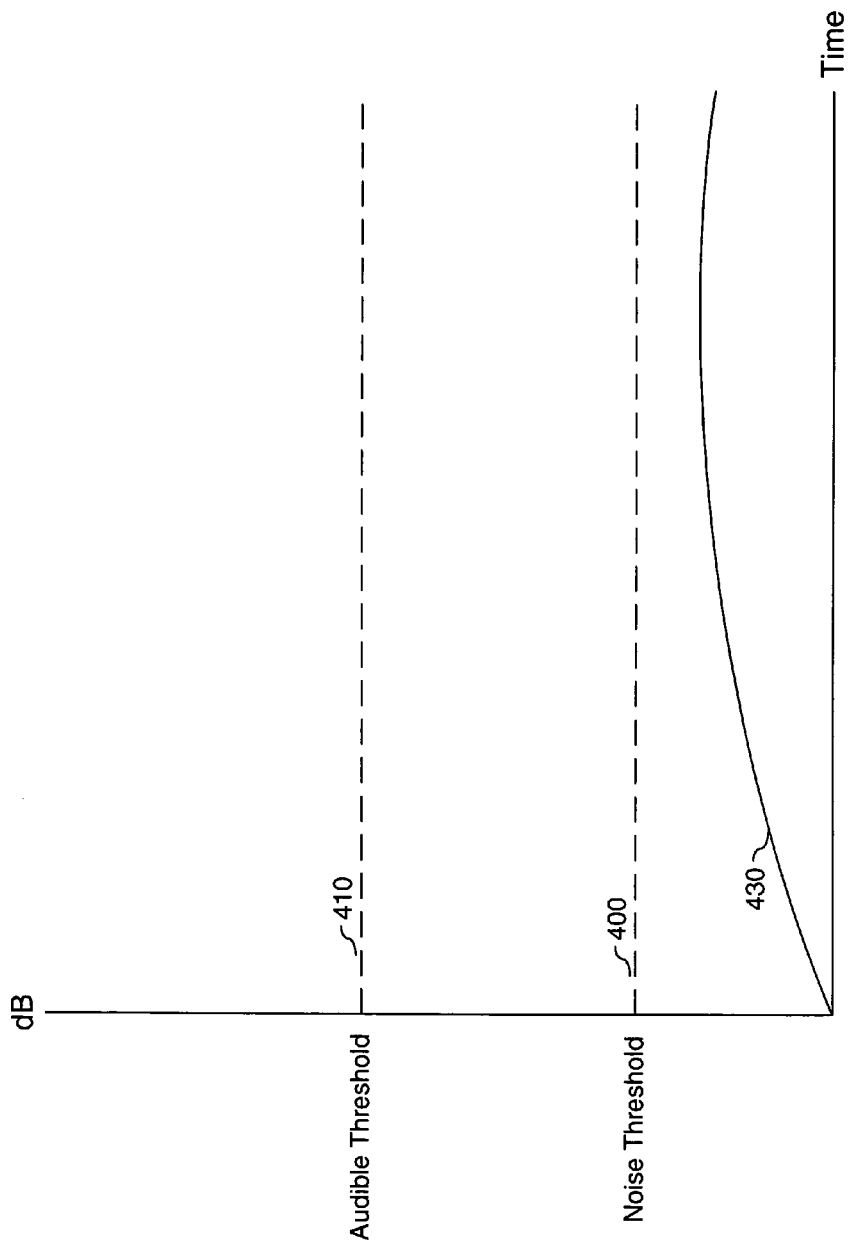
FIG. 4B illustrates a graphical representation of a user not talking resulting in a signal level below an ambient noise threshold comprising background noise.

FIG. 4B is a graphical representation of a non-talking event that is detected by various embodiments of the present invention. The noise threshold 400 is shown at a particular dB level, and the audible threshold 410 is shown at another particular dB level. A speech envelope 430 is shown tracing a generic speech pattern 430. The speech envelope 430 does not cross the noise threshold 400. As a result, the output on the first comparator 345 remains low. This low output drives the output on the AND gate 360 to low resulting in the indicator 380 never being activated.

Figure 4C:
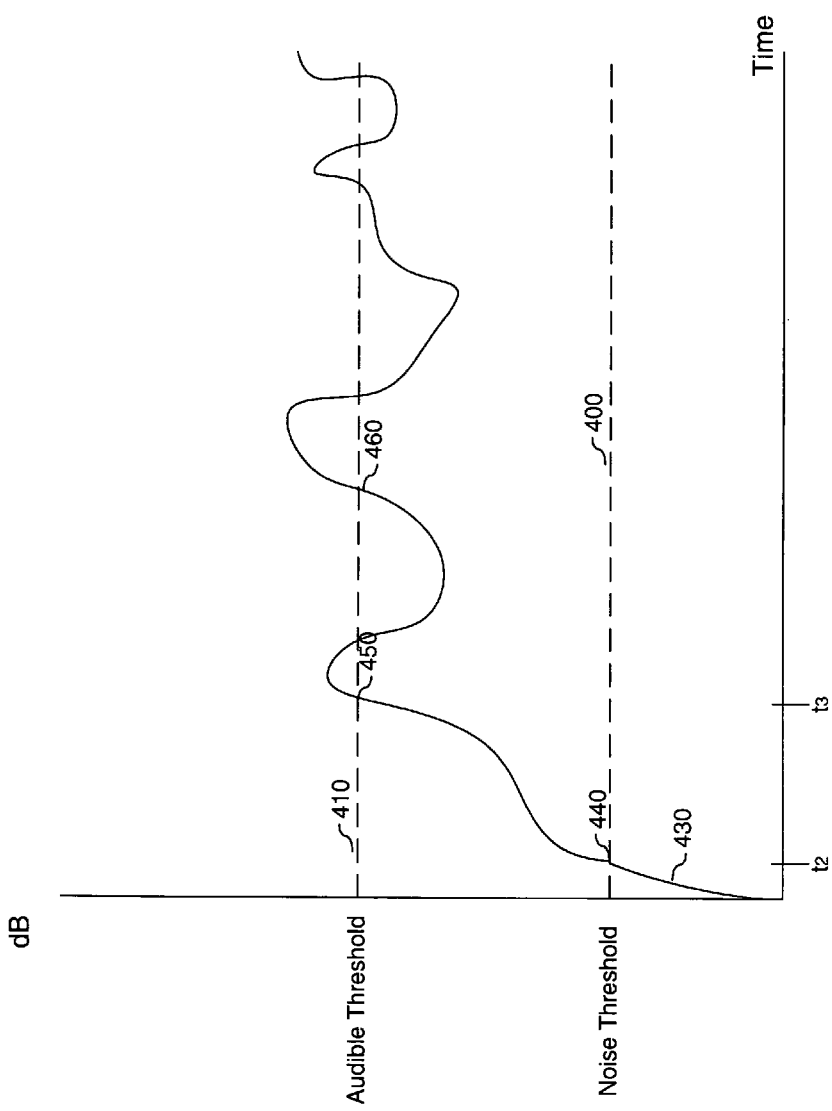
FIG. 4C illustrates a graphical representation of proper speech level at a microphone resulting in a signal level above an audible threshold.

FIG. 4C is a graphical representation of a voice signal of sufficient strength at a microphone on a telephone headset or other communication device that is detected by embodiments of the present invention. A speech envelope 430 is shown tracing a generic speech pattern. At a first point of time $t_2$, the speech envelope 430 crosses the noise threshold 400. As described above, the first comparator 345 goes high while the second comparator 340 remains high. However, the non-retriggerable monostable 355 suppresses an initial microphone misposition or improper speech level indication until the speech envelope can develop. At a second point of time $t_3$, the speech envelope 430 crosses the audible threshold 410. This second point of time occurs before the indication suppression time has expired so there has not been a indication prior to the second point of time $t_3$. At the second point of time $t_3$, the second comparator 340 goes low causing the first retriggerable monostable 350 to output an inverted pulse of a certain time period. This pulse will drive the output on the AND gate 360 to zero and prevent any indication. However, as long as speech above the noise threshold 400 is present, another speech peak within the speech envelope needs to cross the audible threshold 410 within the time period of this pulse in order to prevent a indication. In this example, a second speech peak 460 crosses the audible threshold 410 before the pulse time period expires. The time remaining before the pulse will end is reset to the time period of the pulse. As a result, the indicator 380 is not activated between the two speech peaks even though the speech envelope drops below the audible threshold 410 during this time interval.

C. Description of Misposition/Improper Speech Level Detection Components

Figure 5:
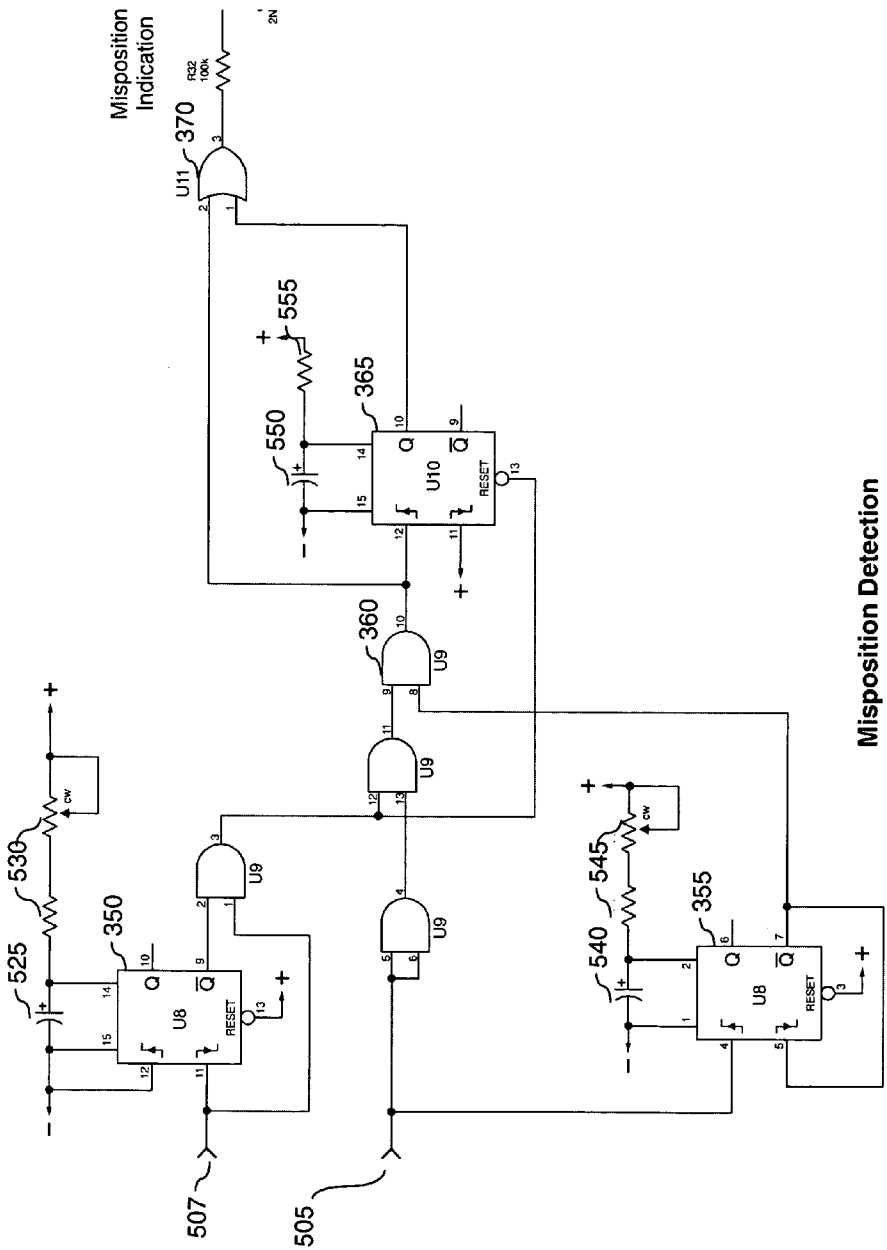
FIG. 5 illustrates a detailed diagram of improper speech level detection circuitry according to the present invention.

FIG. 5 is a detailed diagram of the misposition detection stage circuitry 320. As previously described, the non-retriggerable monostable 355 has an input that receives the first comparator's output 505. The non-retriggerable monostable 355 is also coupled to a first RC circuit comprising a capacitor 540 and at least one resistor 545. The time constant on the inverted pulse generated by the non-retriggerable monostable 355 is equal to the time constant of a first attached RC circuit which is the capacitance of the first capacitor 540 multiplied by the effective resistance of the at least one resistor 545. For example, if a desired time constant of the inverted pulse is 100 ms, then a 1 µF capacitor and an effective resistance of 100 kΩ would provide the desired time constant. The non-retriggerable monostable 355 is activated when the first comparator 345 determines that the speech envelope level has crossed the noise threshold. Once activated, the non-triggerable monostable 355 outputs a single inverted pulse with a corresponding time constant. This inverted pulse is transmitted to the AND gate 360 and drives the output on the AND gate 360 to low. As a result, a microphone misposition or improper speech level indication is inhibited for a period of time equal to the time constant on the non-retriggerable monostable 355.

The first retriggerable monostable 350 has an input that receives the second comparator's output 507. The first retriggerable monostable 350 is coupled to a second RC circuit comprising a second capacitor 525 and at least one resistor 530. The time constant on the inverted pulse generated by the first retriggerable monostable 350 is equal to the time constant of the second RC circuit. For example, if a desired time constant of the inverted pulse is 3 s, then a 1 µF capacitor and an effective resistance of 3 MΩ would provide the desired time constant. The first retriggerable monostable 350 is activated when the second comparator 340 determines that a speech peak of the speech envelope signal has crossed the audible threshold. Once activated, the first retriggerable monostable 350 outputs a single inverted pulse with the corresponding time constant. An additional speech peak crossing the audible threshold as the pulse is being transmitted will retrigger the monostable 350. This new trigger re-starts the time period from zero, thereby extending the length of the inverted pulse. As a result, the inverted pulse may continue as long as the first retriggerable monostable 350 is retriggered within its corresponding time constant. This inverted pulse is transmitted to the AND gate 360 and a reset on the second retriggerable monostable 365. As a result, the output on the AND gate 360 is driven low as long as a speech peak crosses the audible threshold within the time constant of the first retriggerable monostable 350. However, if a speech peak does not cross within this time constant, then the output on the first retriggerable monostable 350 goes high and allows the output on the AND gate 360 to go high unless the output on the non-retriggerable monostable 355 is suppressing the indicator 380 or the first comparator 345 has already gone low.

The second retriggerable monostable 365 is coupled to the output of the AND gate 360 and its reset is coupled to the output of the first retriggerable monostable 350. As described above, the second retriggerable monostable 365 provides a minimum time period for which the indicator 380 is activated. This time period is equal to the time constant of the attached third RC circuit comprising a third capacitor 550 and a third resistor 555. The time constant on the pulse generated by the second retriggerable monostable 365 is equal to the time constant of the third RC circuit. For example, if a desired time constant of the pulse is 1 s, then a 1 µF capacitor and an effective resistance of 1 MΩ would provide the desired time constant. The second retriggerable monostable 365 is activated when the output on the AND gate 360 is high. Once activated, the second retriggerable monostable 365 outputs a single pulse with the corresponding time constant. This pulse is transmitted to an OR gate 370 driving the output of the OR gate high for at least the time duration of the pulse's time constant. The OR gate 370 is also connected directly to the output of the AND gate 360 so that the output will remain high even after the pulse from the second retriggerable monostable 365 has expired should the output of the first comparator 505 remain high while the output of the second comparator 507 also remains high. Should the output of AND gate 360 make a transition from low to high during a pulse this new trigger re-starts the time period from zero, thereby extending the length of the pulse. Therefore, the pulse may continue as long as the second retriggerable monostable is retriggered within its corresponding time constant. As a result, an indication is activated any time the output of the AND gate 360 goes high (i.e. the voice signal is between the two thresholds) and the minimum time period of the activated indication is controlled by the time constant of the second retriggerable monostable 365 (providing that it is not terminated by the first retriggerable monostable 350). The second retriggerable monostable's reset input is coupled to the output of the first retriggerable monostable 350. Should the first retriggerable monostable 350 go active, the second monostable 365 will be reset, terminating any existing pulse and preventing any new pulse for as long as the reset remains low.

D. Method for Sensing Microphone Misposition and Speech Level

Figure 6:
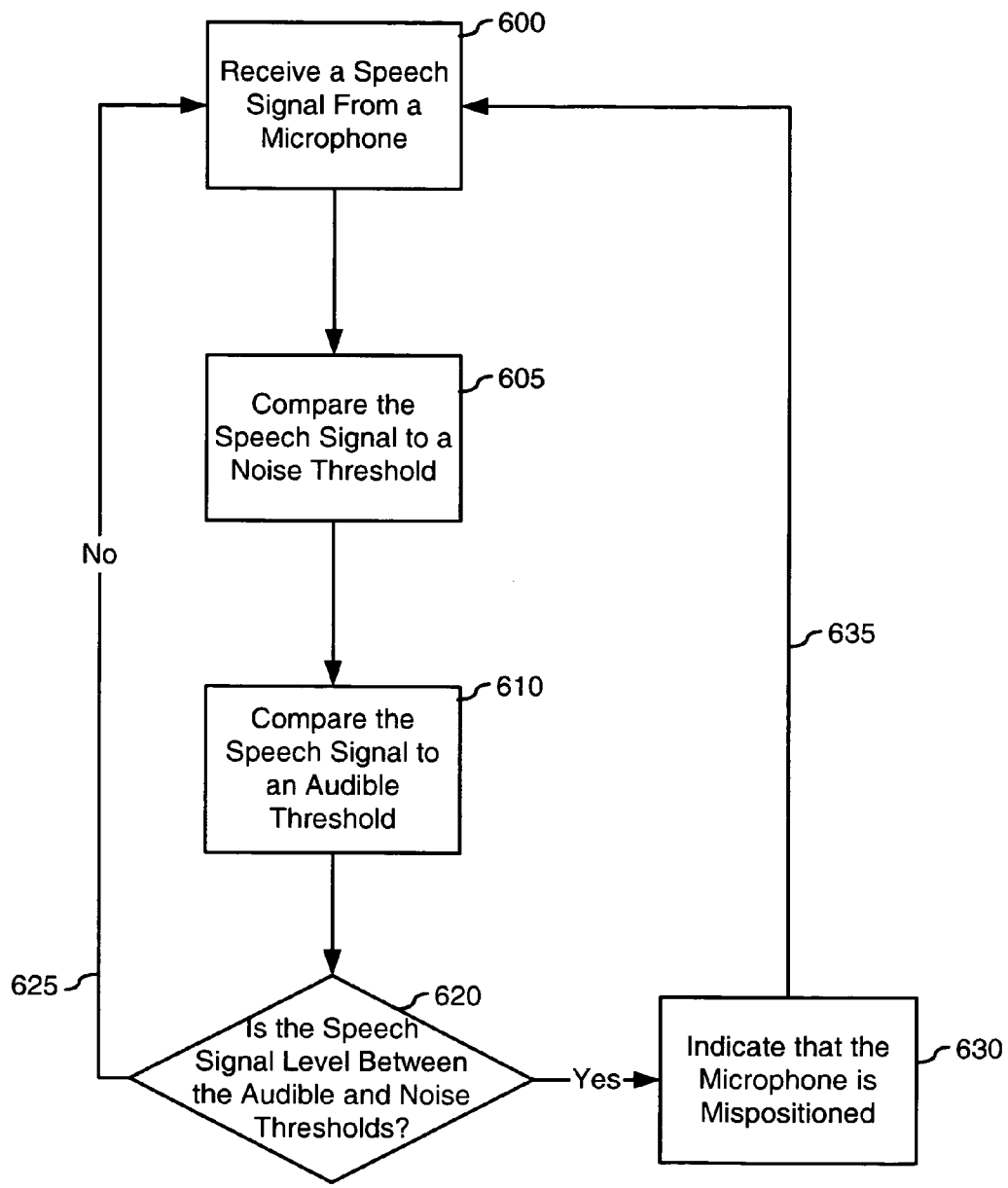
FIG. 6 illustrates a general flow diagram for sensing an improper speech level at a microphone on a headset.

FIG. 6 shows a simplified flowchart describing a method for sensing a voice signal level at a microphone on a telephone headset. This method may be implemented by the foregoing described hardware, or its equivalents, or by a digital signal processor (DSP) suitably programmed. According to this method, a signal is generated at the microphone and transmitted to the sensing device. The sensing device receives 600 the signal and determines whether the signal is sufficiently strong. The signal level is compared 605 to a noise threshold to determine whether a headset user is talking. The signal level is also compared 610 to an audible threshold to determine whether the signal is sufficiently strong to provide quality reception at the other end of the telephone call. Thereafter, the comparisons are analyzed 620 to determine whether (1) the user is talking and (2) the voice signal is too weak. If the user is talking and the voice signal is too weak, then an indicator is activated 630. Typically, this indication is caused by the microphone on the headset being mispositioned. The indicator is activated for a period of time and then the method restarts 635. However, if the headset user is not talking or the voice signal is sufficiently strong, then the indicator is not activated and the method restarts 625.

Figure 7:
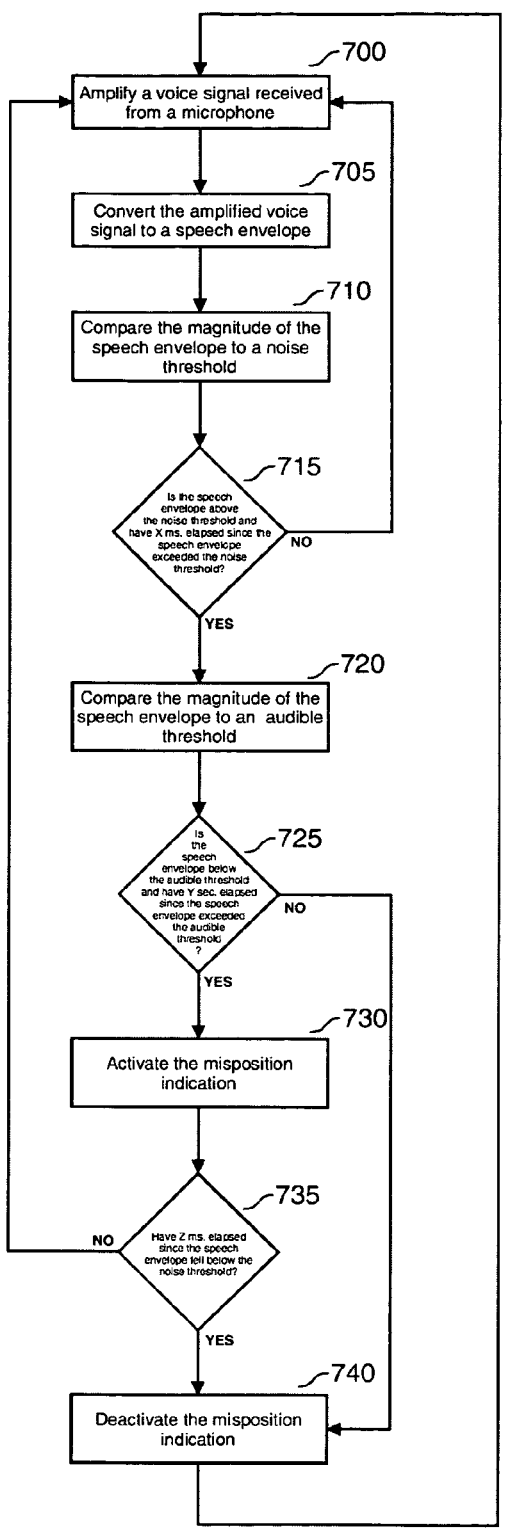
FIG. 7 illustrates a specific flow diagram showing a first method for sensing and indicating an improper speech level at a microphone on a headset.

FIG. 7 shows a detailed flowchart of a method for detecting and indicating a weak voice signal at a microphone in a telephone headset or other communication device. As is the case with FIG. 6, this method may be implemented by the foregoing described hardware, or its equivalents, or by a digital signal processor (DSP) suitably programmed. Additionally, the method is depicted as having multiple steps performed in parallel; however, the steps may also be performed sequentially.

As shown in FIG. 7, a signal is generated at a microphone and transmitted to an amplifier 700. The amplified signal is converted 705 to a speech envelope using a full-wave rectifier and precision envelope detector. As previously described, the full-wave rectifier converts the amplified signal to a unipolar signal representing the instantaneous magnitude of the amplified signal. The precision envelope detector converts the instantaneous magnitude of the rectified signal to a short-term average magnitude, thereby creating the speech envelope. This speech envelope is compared to first threshold to determine whether speech is present in the signal from the microphone and to a second threshold in order to determine whether the strength of the signal at the microphone is sufficiently strong to enable proper communication.

The speech envelope level is compared 710 to a noise threshold representing average ambient noise of the environment in which the microphone is operating. This comparison determines whether a user is talking. If the speech envelope level is above the noise threshold 715, the length of time that it has been above the threshold is compared to a defined time interval (called X in the diagram). If the signal is above the noise threshold and that interval of time has passed since it crossed the noise threshold, the other conditions for misposition or improper speech level indication will be evaluated. If either condition is false, input monitoring will continue. The time interval (X) from the time when the signal crosses the threshold prevents false indications by ignoring noise peaks and giving the speech peaks within the speech envelope time to develop before an indication is generated. If the speech envelope level remains below the noise threshold then condition 715 remains false, further evaluation does not occur and input monitoring continues.

If the speech envelope is above the background noise threshold, speech peaks within speech envelope are compared 720 to an audible threshold representing a speech level required at the microphone for proper communication. This comparison determines whether a microphone is mispositioned, a user is speaking too softly, or other causes of a weak voice signal at the microphone. If a speech peak crosses the audible threshold then a misposition indication is suppressed for a period of time (Y). If an additional speech peak crosses the audible threshold during this suppression period, the period of time is re-initialized to zero 725. However, if a speech peak has not crossed the audible threshold within a certain period of time (Y), then an indicator 380 is activated 730, for a minimum length of time (Z) determined by condition 735. Should a speech peak cross the audible threshold while the indicator 380 is active, the indication will be deactivated 740 until the conditions 715 and 725 both evaluate to true.

As will be understood by those familiar with the art, the invention may be embodied in other specific forms without departing from the spirit or essential characteristics thereof. For example, the particular division of functionality between the various modules, circuits, or components may differ from that described herein, given the variety of software hardware platforms that may be used to practice the invention. For example, the hardware implementations include custom ASICs, discrete logic, FPGAs, PLAs, or DSP with appropriate software programming. Finally the particular naming of the circuit elements is not mandatory or significant, and the mechanisms that implement the invention or its features may have different names or formats. Accordingly, the disclosure of the present invention is intended to be illustrative, but not limiting, of the scope of the invention, which is set forth in the following claims.

What is claimed is:

1. An audio system, comprising:
   a microphone; and
   an audio level sensing device configured to receive audio signals from the microphone to determine whether an audio level at the microphone is at an improper level, the improper level being above a first threshold and below a second threshold, the second threshold being greater than the first threshold, and to provide an output signal in response to the occurrence of an improper audio level;
   wherein the audio level sensing device further includes indicator control logic having a first input coupled to the first comparator, a second input coupled to the second comparator, and an output coupled to the indicator, the indicator control logic adapted to activate the indicator for a minimum time period in response to an audio signal level being between the first threshold and the second threshold.

2. The audio system of claim 1, wherein the audio level sensing device includes:
   a first comparator, in communication with the microphone to receive the audio signals, that determines whether an audio signal level is above the first threshold;
   a second comparator, coupled to the microphone to receive the audio signals, that determines whether an audio signal level is below the second threshold; and
   an indicator, in communication with the first and second comparators, that provides an improper audio level indication in response to the audio signal level being between the first and second thresholds.

3. The audio system of claim 1, further comprising a first logic device having an input coupled to the first comparator and an output coupled to the indicator, that provides a period of time to permit an audio envelope to develop before enabling the indicator.

4. The audio system of claim 1, further comprising a second logic device, having an input coupled to the second comparator and an output coupled to the indicator, that monitors audio peaks within an audio signal to determine whether an audio signal level is above the second threshold.

5. The audio system of claim 4, wherein detection of a speech peak within the speech signal above the second threshold inhibits an improper speech level indication for a period of time following the detection of the speech peak.

6. The audio system of claim 1, wherein the first threshold is dynamically set.

7. The audio system of claim 6, wherein the first threshold is set using an ambient noise level on an audio signal from the microphone during a period of time that a user is not talking.

8. A method for detecting an improper audio signal level at a microphone, the method comprising:
   receiving an audio signal from the microphone;
   comparing the audio signal level to a first threshold;
   comparing the audio signal level to a second level; and
   activating an indicator when the audio signal level is between the first threshold and second thresholds;
   wherein audio peaks within the audio signal are monitored to determine whether the audio signal level is below the second threshold; and
   wherein detection of an audio peak within the audio signal above the second threshold inhibits an improper audio level indication for a period of time following the detection of the audio peak.

9. The method of claim 8, wherein the microphone is part of a telephone headset.

10. The method of claim 8, wherein an improper audio level is visually indicated to a user.

11. The method of claim 10, wherein a light emitting diode is used to visually indicate an improper audio signal level, the light emitting diode being at least one of: positioned on a headset adapter, positioned on the headset, and is a plug-in accessory for a headset adapter.

12. The method of claim 8, wherein an improper audio signal level is audibly indicated to a user.

13. The method of claim 8, wherein an improper audio level indication is provided without providing a feedback signal to a speaker on the headset.

14. The method of claim 8, further comprising delaying an improper audio signal indication for a period of time to allow an audio envelope to develop.

15. The method of claim 8, further comprising providing a minimum period of time in which the indicator remains activated after detecting an improper audio level.

16. The method of claim 8, wherein the first threshold is dynamically set.

17. The method of claim 16, wherein the first threshold is set using an ambient noise level on a signal from the microphone during a period of time that a user is not talking.

* * * * *